(12) United States Patent
Kettenbach et al.

(10) Patent No.: US 7,198,695 B2
(45) Date of Patent: Apr. 3, 2007

(54) METHOD FOR SEPARATING HEMICELLULOSES FROM A BIOMASS CONTAINING HEMICELLULOSES AND BIOMASS AND HEMICELLULOSES OBTAINED BY SAID METHOD

(75) Inventors: Gerhard Kettenbach, Grenzach-Wyhlen (DE); Armin Stein, Kenzingen (DE)

(73) Assignee: Rhodia Acetow GmbH, Freiburg (DE)

( * ) Notice: Subject to any disclaimer, the term of this patent is extended or adjusted under 35 U.S.C. 154(b) by 46 days.

(21) Appl. No.: 10/469,371

(22) PCT Filed: Feb. 8, 2002

(86) PCT No.: PCT/EP02/01359

§ 371 (c)(1),
(2), (4) Date: Jan. 16, 2004

(87) PCT Pub. No.: WO02/075042

PCT Pub. Date: Sep. 26, 2002

(65) Prior Publication Data

US 2004/0108085 A1   Jun. 10, 2004

(30) Foreign Application Priority Data

Feb. 28, 2001   (DE) ................................ 101 09 502

(51) Int. Cl.
*B01D 11/02* (2006.01)
*D21C 3/20* (2006.01)
*D21C 9/02* (2006.01)

(52) U.S. Cl. ............................ 162/72; 162/14; 162/55; 162/60; 162/79; 127/34; 536/128

(58) Field of Classification Search ................. 162/14, 162/55, 60, 72, 79, DIG. 5
See application file for complete search history.

(56) References Cited

U.S. PATENT DOCUMENTS

| | | | | | |
|---|---|---|---|---|---|
| 1,829,110 | A | * | 10/1931 | Richter | 162/79 |
| 3,248,382 | A | * | 4/1966 | Marchessault et al. | 536/119 |
| 4,016,029 | A | * | 4/1977 | Samuelson | 162/31 |
| 4,045,280 | A | * | 8/1977 | Mackie | 162/65 |

(Continued)

FOREIGN PATENT DOCUMENTS

DE    43 17 466 A1   12/1994

(Continued)

OTHER PUBLICATIONS

Japanese First Examination Report (Notice of Reasons for Rejection) dated Aug. 9, 2006 for Japanese Patent Application No. 2002-574426.

*Primary Examiner*—Steven P. Griffin
*Assistant Examiner*—Anna L. Kinney
(74) *Attorney, Agent, or Firm*—Darby & Darby

(57) ABSTRACT

The invention relates to a method for separating hemicelluloses from a biomass containing hemicelluloses. The method includes the steps of: a) extracting the hemicelluloses from the biomass containing hemicelluloses by treating them with a complex compound in an aqueous solution, and forming a soluble hemicellulose complex, and b) separating the complexed hemicelluloses from the biomass. The method is especially suitable for producing high-quality chemical conversion pulp from raw cellulose. The products produced with the method of the invention have a high degree of purity, and the method is extremely economical and causes few emissions. Hemicelluloses in a pure form can be obtained as by-products of the method.

28 Claims, 3 Drawing Sheets

U.S. PATENT DOCUMENTS

Figure 1:
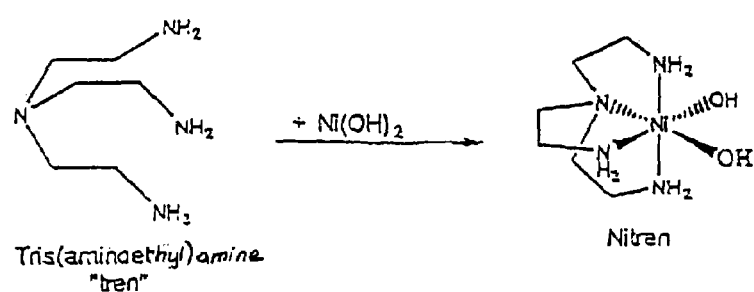
Figure 1:
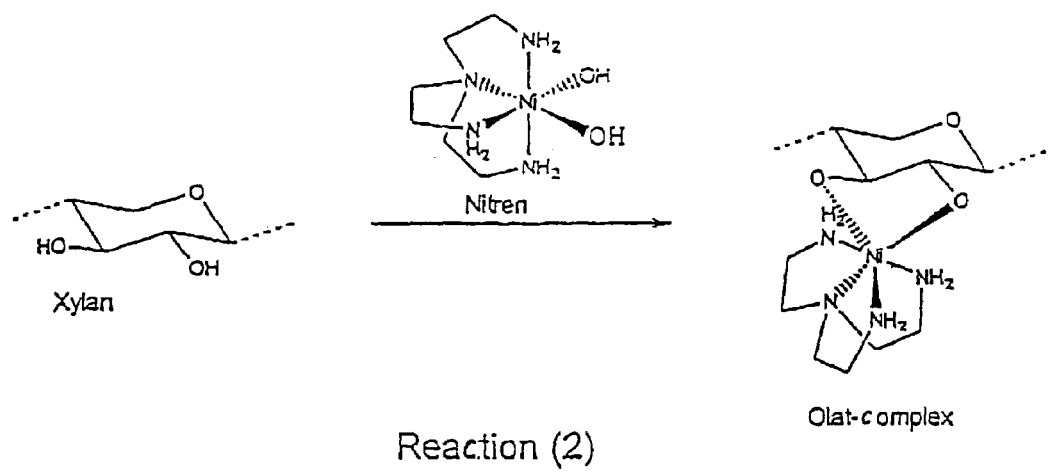

| | | | |
|---|---|---|---|
| 4,281,063 A * | 7/1981 | Tsao et al. | 435/99 |
| 4,622,100 A * | 11/1986 | Godsay et al. | 162/65 |
| 5,057,334 A * | 10/1991 | Vail | 426/634 |
| 5,139,617 A * | 8/1992 | Tikka et al. | 162/72 |
| 5,710,270 A * | 1/1998 | Maeda et al. | 536/124 |
| 5,853,428 A * | 12/1998 | Collins et al. | 8/107 |
| 5,876,779 A | 3/1999 | Greenshields et al. | |
| 6,147,206 A * | 11/2000 | Doner et al. | 536/128 |
| 6,264,790 B1 * | 7/2001 | Jakara et al. | 162/65 |
| 6,409,841 B1 * | 6/2002 | Lombard | 127/37 |
| 2003/0041982 A1 * | 3/2003 | Prior | 162/24 |

FOREIGN PATENT DOCUMENTS

| | | |
|---|---|---|
| DE | 199 16 347 C1 | 11/2000 |
| DE | 198 56 582 C1 | 3/2001 |
| DE | 100 49 340 C1 | 4/2002 |
| EP | 0293309 | 11/1988 |
| GB | 1 500 050 A1 | 2/1978 |
| GB | AT 1582479 | 7/1981 |
| JP | A-S53-035005 | 4/1978 |
| JP | A-HO7-501216 | 2/1995 |
| JP | A-S63-303189 | 12/1998 |
| WO | WO 93/10157 | 5/1993 |
| WO | WO 98/16682 | 4/1998 |
| WO | WO 200034568 A1 * | 6/2000 |
| WO | WO-00/47812 A1 | 8/2000 |
| WO | WO 200047812 A1 * | 8/2000 |
| WO | WO 200061858 A1 * | 10/2000 |
| WO | WO 200229155 A1 * | 4/2002 |

* cited by examiner

Reaction (1)

Reaction (2)

METHOD FOR SEPARATING HEMICELLULOSES FROM A BIOMASS CONTAINING HEMICELLULOSES AND BIOMASS AND HEMICELLULOSES OBTAINED BY SAID METHOD

The invention concerns a method to separate hemicelluloses from hemicellulose-containing biomass as well as biomass and hemicellulose obtained by this method.

In the case of celluloses one distinguishes between paper pulp, that in addition to the main component of α-cellulose may contain hemicellulose up to 25%, and higher grade dissolving pulp with an α-cellulose component of above 90%, the hemicellulose component of which should not exceed a few percents. It is known that the dissolving pulp is one of the most important cost factors in the production of cellulose acetate, filter tow and other high-grade cellulose products. The highest demands are placed on the dissolving pulp, serving as initial substance for the production of these cellulose products. Thus the α-cellulose content, particularly if a subsequent acetylation is intended, should, as a rule, be above 96%. These high-grade types of dissolving pulp are marketed only by a few suppliers with less than 2% of market share of the worldwide pulp production.

For the production of such dissolving pulps from timber or a comparable biomass in addition to the removal of the lignin an as far as possible separation of the hemicellulose is necessary, since timber is a composite material with the basic components of cellulose, lignin and hemicellulose.

According to the state-of-the-art numerous methods have been developed for the chemical decomposition and removal of hemicelluloses from hemicellulose-containing biomasses. A classic method for the removal of hemicelluloses is by the hydrolytic disintegrating process. In this conjunction the treated material can be subjected to a hydrolytic disintegration by, for example, bringing it into contact with superheated steam at elevated pressure. The decomposition of the hemicelluloses achieved on this occasion is, however, not selective, whereby a significant decomposition of the cellulose itself takes place.

A further possibility is the hydrolysis under acidic conditions. The decomposition of the hemicelluloses is not selective enough according to this disintegration method either. A clear decrease of the viscosity is noticed, that can be explained with a considerable decomposition of the cellulose. This decomposition of the cellulose takes place partly together with a deterioration of the whiteness. An improvement can be achieved by a downstream connected extraction of the pre-treated, with steam or acid, pulp with alkaline media. By virtue of this somewhat higher α-cellulose contents can be achieved. But even with this post-treatment the removal of the hemicelluloses is not sufficiently selective. It is surprising, that this classic disintegrating method of the hemicelluloses with acids and bases turns out to be completely useless. The cause of this is presumably that in high-yield paper pulps the hemicelluloses precipitate partly again on the cellulose fibres. In this form the hemicelluloses are obviously more difficult to disintegrate hydrolytically than in the original raw material, timber.

A further known possibility to separate hemicelluloses from hemicellulose-containing biomass is by selectively decomposing the hemicelluloses using suitable oxidative or reducing treatment and thus bring it to a soluble and, consequently, extractable form. The chemical reactions taking place in this conjunction are similar to those which are also used for the improvement of the pulp. On this occasion typically oxidising agents, like urea nitrate, $H_2O_2$ and percarbamide in aqueous solution, partly under alkaline or acidic conditions, or reducing agents, like $Na[BH_4]$ in water or methanol, for example, are used. By the oxidative decomposition with, for example, percarbamide, it is possible in principle to decompose hemicelluloses in the paper pulp. The range of high qualitative dissolving pulp with an α-cellulose content of above 96%, however, cannot be achieved without perceptible DP decomposition of the cellulose. No sufficiently selective decomposition of the hemicelluloses without accompanying cellulose decomposition can be achieved with this method either.

Consequently, the methods according to the state-of-the-art are either based on expensive raw materials, particularly cotton linters, or require an elaborate management of the method, while, as a rule, the pulp is more or less damaged, resulting in a lowering of the degree of polymerisation (DP value), loss of accessability or reactivity and an undesirable colouring, for example during a subsequent acetylation. U.S. Pat. No. 5,876,779 concerns a method for the production of a cellulose-containing grain extract. On this occasion plant fibres are extracted with a sodium hydroxide solution. The mixture obtained is acidified to precipitate a first hemicellulose fraction. A second hemicellulose fraction is precipitated from the filtrated material obtained by adding ethanol. The extract claimed is essentially an alkaline-soluble complex of a hemicellulose mixture.

Having this background in mind, the object of the invention is to provide a method for the separation of hemicelluloses from hemicellulose-containing biomass, that avoids the disadvantages of the above described method and makes it feasible to obtain high-grade pulps in a simple and gentle manner. In particular the method should make a selective separation of the hemicelluloses from the cellulose-containing biomass possible without a significant decomposition of the cellulose. Furthermore, the method should operate economically, i.e. cost effectively and not produce at all or produce only little environmentally damaging emissions.

According to the invention this objective is achieved by a method to separate hemicelluloses from hemicellulose-containing biomass by the following steps:
a) extraction of the hemicelluloses from the hemicellulose-containing biomass by treating it with a complex compound in aqueous solution thus forming a soluble complex of the hemicelluloses, wherein in step a) as complex compound a coordination compound from a transition metal and a unidentate or polydentate nitrogen-containing and/or oxygen-containing ligands are used,
b) separation of the complexed hemicelluloses from the biomass.

Accordingly, the method according to the invention relates to the production of high-grade pulps with an α-cellulose proportion of approx. above 96% and a very small hemicellulose component. Therefore it makes a highly selective separation of hemicelluloses from the hemicellulose-containing biomass under mild conditions in the form of an extraction possible, while no decomposition of the cellulose worth mentioning takes place.

Within the scope of the invention the biomass that can be used as initial material in the method according to the invention is not subjected to any limitation. Examples of preferred raw pulps are: coniferous wood sulphate, spruce sulphite, beech sulphite and eucalypt sulphate. Raw pulp, for example, represents a particularly suitable initial substance for the method and thus can be purified to a high-grade dissolving pulp. Raw pulps, that have been obtained by delignifying lignocellulose-containing biomass, particularly timber, are preferred. The biomass is introduced preferably in a finely comminuted, particularly ground, form.

According to step a) of the method according to the invention a complex compound is introduced into an aqueous solution that with the hemicelluloses forms soluble complexes and leaches them out of the biomass. On this occasion coordination compounds from a transition metal and a unidentate or polydentate nitrogen-containing and/or oxygen-containing ligands are used. Particularly preferred transition metals are nickel, copper, cadmium, cobalt, palladium and/or zinc. As ligands polydentate nitrogen-containing ligands are preferred, in particular tris(2-aminoethyl) amine, ethylene diamine and/or diethylene triamine. According to an embodiment preferred by the invention as complex compound [Ni(tris(2-aminoethyl)amine) (OH)$_2$], described in the following as "nitren", is used, while "tren" designates the ligands tris(2-aminoethyl)amine.

The concentration of the complex compound in aqueous solution is preferably in the range of approx. 0.1 to 10, in particular approx. 1 to 3% by weight. If the value falls below 0.1% by weight, soluble complexes of the hemicellulose can no longer be formed. If a concentration of the complex compound in the aqueous solution exceeds 10% by weight, a marked dissolving of the cellulose may already occur, which is undesirable.

The extraction can be carried out in one or several stages, carried out preferably in counter-current. The temperature during the extraction is preferably in the range of approx. 0° C. to 90° C., particularly approx. 10° C. to 80° C. and most particularly preferred approx. 20° C. to 40° C. The duration of the extraction is approx. 5 min to 16 hours, particularly approx. 15 min to 2 hours. The liquor ratio used during the extraction in a preferred embodiment is approx. 1:3 to 1:30, in particular approx. 1:5 to 1:20, while within the scope of the invention under "liquor ratio" the ratio of the hemicellulose-containing biomass (in kg) to the aqueous solution of the complex compound (in L) is understood. The pH value during the extraction is preferably 10 to 14, in particular approx. 13 to 14.

The complexed hemicelluloses, present in the solution by virtue of the reaction with the complex compound, are separated afterwards in step b) from the remaining biomass modified by the method. The separation is carried out preferably by filter presses. To enable the purification of the expressed biomass, modified by the method, from the adhering residues of the complexed hemicelluloses, the biomass is appropriately subjected to one or several washing stages. The washing is preferably carried out with water and/or an aqueous solution of a diluted acid, like acetic acid, a complex former for the transition metal, like tris(2-aminoethyl)amine, and/or ethanol amine, NaOH or ammonia. Washing with an aqueous solution of ammonia with a concentration of approx. 0.5 to 3%, in particular approx. 1%, has proved itself as particularly advantageous. To achieve an even more effective purification of the biomass modified by the method, the washing step may be carried out also in the form of a Soxhlet extraction, for example with an approx. 0.5 to 3% acetic acid. The pulp obtained thus can be directly used or further processed in the conventional manner, for example by derivatisation.

By lowering the pH value to below 10, in particular to approx. 5 to 3, the hemicelluloses can be precipitated from the separated solution of the complexed hemicelluloses. Due to the lowering of the pH value the Olat complexes formed become unstable, resulting in the precipitation of the hemicelluloses. After the precipitation the hemicelluloses can be isolated by, for example, filtration, and subsequently possibly washed once or several times.

Subject matter of the invention is also the biomass modified by the method and obtained by separating the hemicelluloses, that is characterised by a low residual contents of the hemicelluloses. The modified biomass obtained in this manner preferably has a residual contents of hemicelluloses of less than approx. 8%, particularly less than approx. 4%.

This invention further concerns also hemicelluloses obtainable by the method according to the invention, xylan or galactomannan, for example. A particularly interesting product that is present when isolating the hemicelluloses, is xylan. Polymeric xylan is in particularly great demand by the pharmaceutical industry.

Xylan is used as raw material for the production of xylan polysulphate (pentosan polysulphate). Xylan polysulphate has a diverse activity spectrum, that is comparable with that of heparin. The continuously increasing demand of such active substances cannot be satisfied by natural heparin, so that substitute materials are being sought all the time. Xylan polysulphate is used, for example, as antithrombotic agent, anticoagulant, for the lowering of the blood's fat contents, against arthrosis, as immuno-stimulant (anti-AIDS, anti-tumour) and in further pharmaceutics with an extensive application in the indicated spectrum (e.g. TAVAN-SP 54®, FIBREZYM®, THROMBOCID®, KLISMACORT®, TACHOLIQUIN®, CARTOPHEN VET®, ELMIRON® and others). Therefore it becomes obvious that the hemicelluloses, that can be isolated according to the invention, are of great interest for industrial application.

A further factor to be considered after the completion of step b) of the method is the residual contents of the transition metals, like nickel, for example, that by virtue of the complex compound passes into the precipitated biomass, modified by the method, and the hemicelluloses. If the contents in the products of the method of the transition metal is too high for a desirable further processing, it is possible to reduce this by washing and/or treatment steps to a desirable level. In some cases it may be an advantage if the biomass, modified by the method and obtainable by the method according to the invention, has a contents of the transition metal in question below approx. 100 ppm, particularly below approx. 10 ppm, what can be achieved, for example, by appropriate washing.

The economic consideration of the method according to the invention leads altogether to very positive results. The economy stems from the fact that the hemicelluloses, present complexed in the solution, can be separated without great expense from the biomass by simple steps of the method. From the point of economics it is a particular advantage when the separated hemicelluloses precipitate particularly in the form of xylans and mannans and thus represent a valuable by-product. Therefore the method proves to be particularly effective for paper pulps with a high proportion of xylan, like eucalypt pulp (Cellbi of Bacell), for example.

For a further improvement of the economics one can appropriately rely on technologies, like steam recompression or diaphragm separation, for the recovery or concentration of the complex compound used in the solution, so that the extracting agent can be reused and an economical management with a circulation is possible. One may start with cost-effective raw materials, like paper pulp, for example. The method leads to a high-grade dissolving pulp, in which the cellulose did not experience any reduction of the DP by hydrolytic or oxidative decomposition.

A combination of the method according to the invention with known methods is also feasible. Thus the known delignifying process can be advantageously combined with the method according to the invention into an economically interesting total process. Thus a cost-effective high-yield pulp can be delignified in a first stage (e.g. treating spruce timber with ethanol amine), directly followed by the method according to the invention as a second stage. By combining the two methods energy can be saved, since additional intermediate stages for purification or drying can be dispensed with. Furthermore, the normally employed pH exchange to disintegrate the hemicelluloses can be omitted. This means that losses of yield can be avoided and a lower cellulose decomposition is achievable by combining the two methods.

Figure 2:
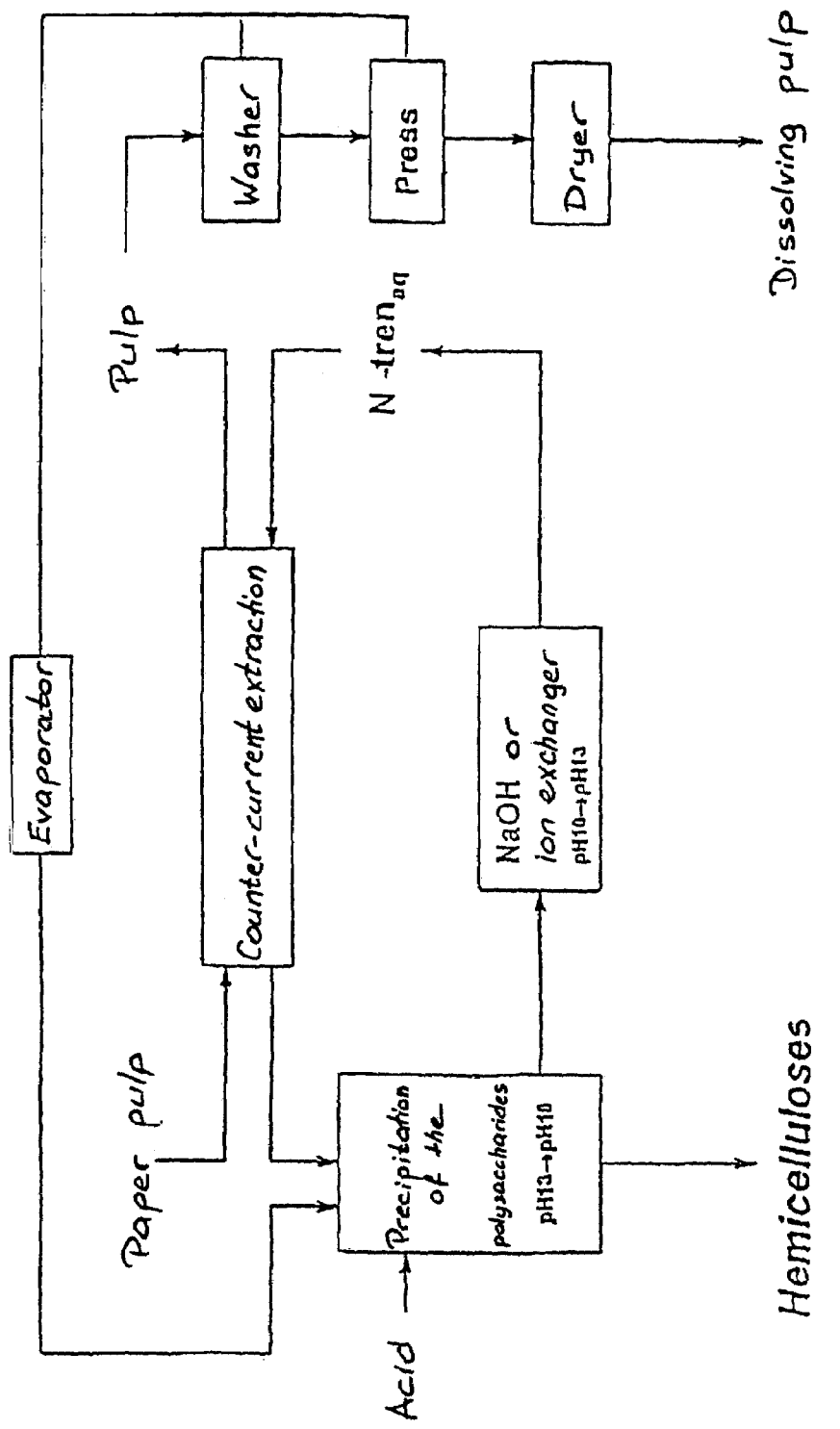
Figure 3:
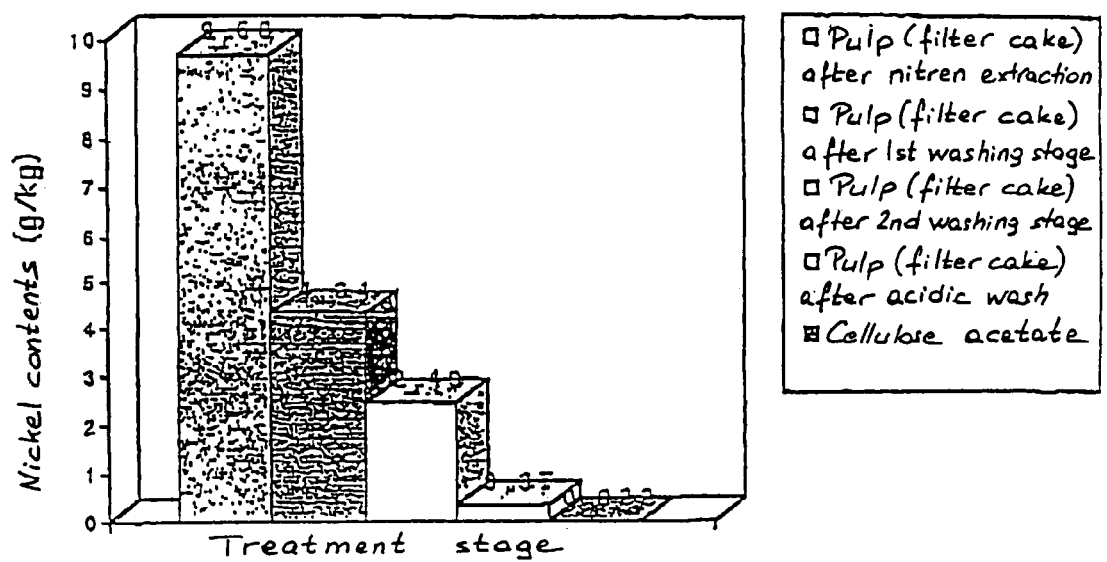
Figure 4:
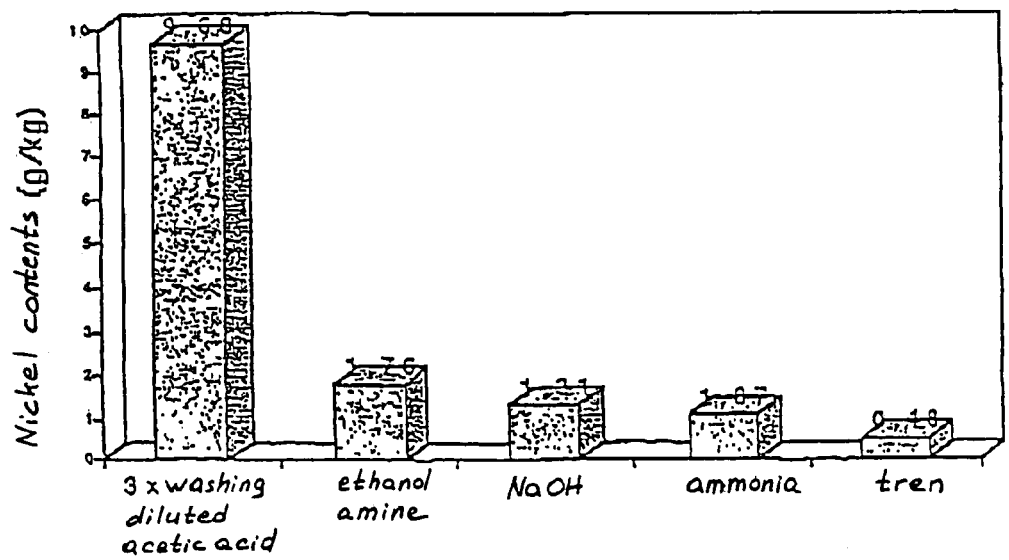

The technical teaching according to the invention is further illustrated in the following based of the attached figures, while the invention is not limited to the embodiments explained. Rather do further refinements within the scope of the teaching of the invention become familiar to the person skilled in the art. The figures show in:

FIG. 1—the chemical formula of a complex compound that can be used according to the invention for the extraction of hemicelluloses from the biomass as well as their reaction of formation and reaction according to the invention;

FIG. 2—a schematic illustration of a preferred embodiment of the method according to the invention;

FIG. 3—a diagram of the residual nickel contents in the pulp or cellulose acetate after various stages of the washing/method, and FIG. 4—a diagram of the residual nickel contents in xylan after various stages of washing.

FIG. 1 shows an example of a complex compound for the extraction of hemicelluloses from the hemicellulose-containing biomass according to step a) of the method according to the invention. In this case one deals with a coordination compound from a transition metal and a polydentate nitrogen-containing ligand, wherein the transition metal represents nickel. According to this example the polydentate nitrogen-containing ligand is tris-(2-aminoethyl)amine and is obtained by reacting nickel(II)hydroxide with (tris(2-amino ethyl)amine in a 1:1 ratio as complex. Reaction (1) represents the formation of [Ni(tris(2-aminoethyl)amine)(OH)$_2$] ("nitren"). One deals here with a deep blue solution with a pH value of approx. 13 to 14. The complex forms relatively stable Olat complexes with dihydric alcohols, like sugar alcohols, for example. The complex formation of nitren with hemicelluloses is illustrated in reaction (2) in the example of xylan.

Due to the complex-forming properties the nitren is in the position to dissolve the polysaccharides. The concentration of the nitren required for this depends from the structure, i.e., inter alia, from the sugar building blocks, the coupling, the length of the chain and the molecular weight of the polysaccharides. The concentration of the complex compound in aqueous solution is advantageously in the range of approx. 0.1 to 10% by weight.

FIG. 2 shows a simplified diagram of a preferred embodiment of the method according to the invention. In this case according to step a) the pulp to be extracted is reacted with the complex compound [Ni(tren) (OH)$_2$] ("nitren") in a diluted aqueous 1–4% solution and intensively mixed for some time. According to step b) it is filtered, washed with a 0.4% sodium hydroxide and afterwards with water. Afterwards the extracted pulp, modified by the method and possibly after drying, can be further processed, for example, by derivatisation. The blue filtered matter is reacted with a little acid, due to which the pH value changes from 13 to 10. By virtue of this the hemicelluloses precipitate and can be separated in a simple manner. By adding NaOH and thus raising the pH value from 10 to a pH value of 13 the extracting agent is regenerated and can be returned into the circuit.

The described regulation of the pH may also be carried out via an ion exchanger. Thus, for example, the concentration of salts in the extraction circuit would be avoided, what could impair the properties of the extraction agent. The washing lyes, occurring during the purification of the pulp, can be concentrated via an evaporator and returned to the circuit. Thus the chemicals used in this version of the invention are sodium hydroxide, acids or ion exchanger, while they are used altogether in considerably smaller quantities than in the known alkaline extraction methods.

Based on a diagram FIG. 3 illustrates the residual nickel contents of the pulp or the cellulose acetate in accordance with the various washing/treatment steps. The invention has shown that it could be an advantage to appropriately reduce the residual contents of the transition metal from the complex compound used. Thus it is possible to remove the nitren residues from the pulp by an appropriate washing with, for example, water. The remaining contents of the transition metal can be markedly reduced by further washing with diluted acids, like acetic acid. Thus, after expressing a filter cake with a solids contents of approx. 40% by mass and a nickel contents of 0.37 g Ni/kg of wet pulp, the nickel contents can be clearly reduced by Soxhlet extraction with 1% acetic acid to 0.029 g Ni/kg of the filter cake.

In addition, a counter-current wash can also be carried out to increase the effectiveness of the washing process.

The adding of suitable displacing ligands, like an ammonia solution or diluted sodium hydroxide, to the wash may also be considered, which release the complex compound and the polysaccharide from the Olat complex.

A further possibility to lower the contents of the transition metals is by carrying out an exchange of the solvents. For example, a pulp with a 0.37 g Ni/kg of filter cake is subjected after solvent exchange to acetylation in glacial acetic acid and saponification to 2,5-cellulose acetate. The cellulose acetate obtained had a residual nickel contents of only 23 ppm.

To be used as a filter tow, the contents of the transition metal has to be preferably reduced to below 10 ppm. This can be achieved, for example, by precipitating the cellulose acetate, possibly obtaining a residual contents of less than 1 ppm.

The individual treatment stages with the respective residual nickel contents become obvious from FIG. 3.

FIG. 4 illustrates that also with regard to the separated hemicelluloses there is the possibility to reduce the nickel contents to a desired level by an appropriate post-treatment. Appropriately this is carried out when a commercially utilisable quality of, for example xylan, is required. Thus washing with basic, displacing ligands give a clearly positive effect. The efficiency of the nickel removal from, for example, xylan, increases for a 1% solution each with the sequence: ethanol amine<NaOH<ammonia<tris-(2-aminoethyl). As anticipated, the post-treatment of a nickel-containing xylan precipitation with nitren in excess is the most effective. There is also the possibility of the treatment with a 1% ammonia solution, which is particularly advantageous since due to its volatility the ammonia can easily be expelled and separated from the strongly alkaline nitren solution.

The advantages associated with the invention are manifold: Thus the method according to the invention with regard to the quantitative and qualitative conditions shows a surprising flexibility when compared with the method according to the state-of-the-art outlined in the introduction. Numerous pulps can be used as initial materials, making a simple access to dissolving pulps possible by removing the hemicelluloses. One can commence with cost-effective raw materials, like paper pulp, for example. The paper pulp leads to a high-grade dissolving pulp, in which the cellulose was not subjected to a reduction of the DP by hydrolytic or oxidative decomposition. Consequently, a sufficiently selective and effective removal of the hemicellulose is possible in a simple manner without damaging the α-cellulose. Thus paper pulp (typical α-cellulose contents approx. 81%) can be improved, without damaging the pulp (no cellulose decomposition), to become a dissolving pulp with a α-cellulose contents of above 96%. Moreover, the accessability and consequently the reactivity of the pulp is increased in comparison with pulps produced according to the known methods.

In this manner highly purified dissolving pulps can be used for special applications, for example as linter substitute or for derivatives, which require a particularly high degree of polymerisation and α-cellulose content, like cellulose ester, cellulose ether, cellulose nitrate, etc., for example. According to the invention an improvement of the raw linter to linter pulp can also be carried out, what is of particular interest from the point of view of economics.

An essential advantage of the method according to the invention is that apart from the simple execution in a few steps at room temperature or even by cooling, the extracting agent can be reused by, for example, employing steam recompression or diaphragm separation, so that an economical management in the circulation is possible. By recovering the complex compound, its loss per process cycle can be adjusted to less than approx. 2%, so that the cost of the chemicals remain low. Due to this the use of the method according to the invention is feasible on an industrial scale.

After the separation of the solution containing the complexed hemicelluloses from the extracted biomass, modified by the method, the hemicelluloses in the form of, for example, xylans or galactomannans, can be isolated by precipitation almost quantitatively in polymeric form and thus further processed to a final product and used commercially. The hemicelluloses represent valuable by-products of the method according to the invention and are in great demand, for example, in pharmaceutics.

It is a further possibility to reduce, if necessary, the contents of the transition metals in the products obtainable by the method to a desirable level by appropriate treatments, like washing and treatment stages, so that no problems in this regard would arise during a further processing.

Moreover, the method described is suitable to be combined with other known methods, like for the separation of hemicelluloses from timber delignified by ethanol amine extraction and can consequently be particularly advantageously coupled with that method. By virtue of this steps of the method can be dispensed with since a direct further processing is possible.

Due to the high efficiency, the low energy requirement and the possibility of recovering, almost completely, the complex compound used, the method according to the invention is very economical and environmentally friendly at the same time.

In the following the invention is explained in detail based on examples, that should not limit the teaching according to the invention. Within the scope of the disclosure according to the invention further embodiments are obvious to the person skilled in the art.

EXAMPLES

The κ (kappa) number (lignin contents) stated in the following was carried out based on the determination according to Zellcheming Pamphlet IV/37/80. In this conjunction the titration was carried out with 0.1 n potassium permanganate solution (3.161 g/L). The quantity in mL of 0.1 n potassium permanganate solution consumed for the hydration of 1 g of pulp corresponds to the κ number. The lignin contents (in % of the pulp) can be estimated from the κ number by multiplying with 0.15.

Example 1

Composition of the Initial Pulps

Paper pulps of various manufacturers have been selected for the experiments as initial substances. They differ with regard to the raw materials (types of timber) used as well as the disintegration and bleaching process. The corresponding analysis data are summarised in Tables 1 to 3.

TABLE 1

Characterisation of the initial pulps

| | κ number | ash % | $SiO_2$ % | DCM % | Viscosity mL/g | R 10% | Whiteness* % ISO |
|---|---|---|---|---|---|---|---|
| Spruce sulphite ECF | 1.58 | 0.24 | <0.01 | 0.24 | 795 | 86.15 | 87.5 |
| Eucalypt sulphite ECF | 0.96 | <0.01 | <0.01 | 0.07 | 904 | 94.84 | 89.2 |

*measured on the pulp sheet
DCM - dichloromethane extract
R10 - 10% extract with sodium hydroxide (see DIN 54355)
ECF - bleached free of elementary chlorine

TABLE 2

Relative carbohydrate composition of the initial pulps

| | Glucose % | Mannose % | Xylose % | Residue % |
|---|---|---|---|---|
| Spruce sulphite ECF | 85.74 | 6.96 | 7.72 | 0 |
| Eucalypt sulphate ECF | 80.57 | 0 | 18.65 | 0 |

The values are average values of three individual determinations.

TABLE 3

Metal contents of the initial pulps

| | Ca ppm | Mg ppm | Mn ppm | FE ppm | Cu ppm |
|---|---|---|---|---|---|
| Spruce sulphite ECF | 98 | 352 | 1.0 | 34.6 | 0.6 |
| Eucalypt sulphate | 129 | 74 | 0.3 | 4.8 | 0.6 |
| Eucalypt sulphate (after washed by water) | 136 | 49 | 0.3 | 4.9 | 1.1 |
| Eucalypt sulphate (after washed by water, ruffled) | 143 | 26 | 0.4 | 16.9 | 4.4 |

Thus the selected pulps represent a wide selection of paper pulp types with various α-cellulose contents (approx. 80 to 89%) with various compositions of the hemicelluloses (xylan 4 to 19%, mannan 0 to 7%). There are, furthermore, depending from the method of manufacture, partly considerable differences, particularly in the structure of the leaves and fibres, the residual lignin contents (κ number) as well as the distribution of the hemicelluloses.

Various paths can be followed for the production of dissolving pulp from paper pulp. Amongst these are the classic disintegration of hemicelluloses with acids and bases as well as an oxidative or reductive decomposition of the hemicelluloses. In the following some possibilities are described based on comparative examples.

Comparative Example 1

Hydrolytic Disintegration

For the hydrolysis without acidic or basic additives a steam treatment was carried out at 140° C. (p=3.6–3.7 bar) with treatment times of 20–80 minutes on eucalypt pulp as an example. The R18 value (18% sodium hydroxide; see DIN 54355) was reduced on this occasion from approx. 95% to 91.5%, and the viscosity, that is directly proportional to DP, from 920 to 370 mL/g. The comparison with the analyses of the initial pulp with approx. 80% α-cellulose contents shows that under these conditions no selective decomposition of the hemicelluloses and a significant decomposition of the cellulose takes place. Such a treatment of pulp types under the conditions described is therefore extremely disadvantageous.

Comparative Example 2

Disintegration under Acidic Conditions

The experiments of acidic hydrolysis of hemicellulose were carried out both with glacial vinegar and diluted acetic acid (1%). The treatment lasted 20–120 minutes at temperatures of 40–140° C. The hemicelluloses did not decompose selectively enough according to this method of disintegration either. A clearer reduction of the viscosity is already noted, that can be explained with a considerable decomposition of the cellulose. This decomposition of the cellulose takes place partly with a deterioration of the whiteness. The results are illustrated in Table 4.

TABLE 4

Disintegration of eucalypt sulphate paper pulp under acidic conditions

| Treatment | Temp. °C. | Time min | Yield % | η mL/g | R18 | Whiteness |
|---|---|---|---|---|---|---|
| Untreated | — | — | | 920 | 95 | 91.7 |
| 1% acetic acid | 140 | 20 | 98.6 | 430 | 92.5 | 88.6 |
| 1% acetic acid | 140 | 40 | 94.3 | 340 | 91.3 | 86.9 |
| 1% acetic acid | 140 | 80 | 95.9 | 280 | 90.0 | 85.1 |
| Glacial vinegar | 80 | 40 | 99.9 | 875 | 93.4 | 91.8 |
| Glacial vinegar | 140 | 40 | 93.7 | 260 | 85.3 | 86.7 |

Comparison Example 3

Alkaline Extraction with Steam and Acid Treatment

Although by a downstream connected extraction of the pulps, treated with steam or acid, somewhat higher α-cellulose contents of approx. above 90% are achieved, but even with this treatment the removal of hemicelluloses is not adequately selective or even complete in the case of any of the pulp specimens.

Example 2

Single-stage Extraction of Eucalypt Pulp

The suitability of the method according to the invention for a gentle separation of hemicelluloses from raw pulp was investigated in the example of the extraction from eucalypt pulp, using nitren. The extraction is carried out with a 3% nitren solution at room temperature over various periods of time. The results are shown in Table 5.

TABLE 5

Single-stage extraction of eucalypt pulp with a 3% nitren solution at room temperature

| Period of treatment | α-cellulose contents % |
|---|---|
| nil | 80.57 |
| 30 min | 92.11 |
| 16 h | 92.80 |

The results shown in Table 5 clearly show, that by extracting with nitren an efficient separation of the hemicelluloses is achieved while producing a pulp with a high α-cellulose content. It has been further shown, that in the case of the eucalypt pulp used a prolongation of the period of extraction over 30 min does not bring any advantage with it. In the case of the periods investigated (30 min and 16 hours) practically no difference can be observed between the α-cellulose contents achieved with the different extraction periods. The values obtained fluctuate within the error range of the method. It is, however, to be noted that when using plates of pulp (or roughly comminuted pulp) approx. 1 to 2 hours are necessary for a uniform wetting and swelling of the pulp, so that the extraction periods extend accordingly.

Under the conditions mentioned no cellulose decomposition could be measured. In a direct comparison after the nitren extraction limit viscosities higher than those in the untreated pulp could be measured. This could be explained foremost by the extraction of the hemicelluloses.

Example 3

Single- and Two-stage Extraction of Eucalypt Pulp

For purposes of comparison, in addition to the single-stage nitren extraction a two-stage nitren extraction was also carried under the same conditions as in Example 2. The results are shown in Table 6.

TABLE 6

Limit viscosities of eucalypt pulp with and without nitren treatment

| Eucalypt pulp | Viscosity (Cuen)* mL/g |
|---|---|
| Untreated | 840 |
| Single-stage nitren extraction | 905 |
| Two-stage nitren extraction | 970 |

*Cuen (see DIN 54270)

The above viscosity values show that no cellulose decomposition takes place at any of the extractions.

Example 4

Two-stage Extraction of Eucalypt Pulp and Spruce Sulphite Pulp

For the purposes of comparison in addition to eucalypt pulp spruce sulphite pulp (Paskov) was also subjected to a two-stage extraction with a 3% nitren solution at a liquor ratio of 1:10. The results are shown in Table 7.

TABLE 7

Two-stage extraction (liquor ratio 1:10) with 3% nitren solution

| Pulp | Temp. °C. | No. of extraction stages | Glucose % | Xylose % | Mannose % |
|---|---|---|---|---|---|
| Eucalypt sulphate | Untreated | | 80.57 | 18.65 | 0 |
| Eucalypt sulphate | 0 | 2 | 94.81 | 5.07 | 0.12 |
| Eucalypt sulphate | 25 | 2 | 96.13 | 3.76 | 0.11 |
| Spruce sulphite | Untreated | | 85.74 | 7.72 | 6.96 |
| Spruce sulphite | 25 | 2 | 95.04 | 0.46 | 4.50 |

The results with the spruce sulphite pulp show that nitren leaches preferably xylan from the paper pulps.

The thus dissolved hemicelluloses were precipitated from the nitren solution by lowering the pH value. The precipitation commenced at pH 10 and was complete at pH 4. According to the carbohydrate analysis in the case of single-stage extraction an almost pure (approx. 99%) xylan was obtained. After the two-stage extraction the precipitation obtains from the extract approx. 85% xylan and approx. 15% glucose. It needs to be noted, that the xylan obtained in this manner is free of the otherwise usual brown colouring in the polymeric form.

Example 5

Balance of Nickel Based on a Single-stage Extraction of Pulp with Subsequent Washing Steps.

In the following based on a tabulated summary a version of the method according to the invention is illustrated in detail. Nitren was used as complex compound.

After the extraction it was expressed and washed twice with water and once with 0.5% acetic acid.

Extraction (single-stage)

Pulp $C_0$

| Gross | Moisture | α-cellulose | Hemicelluloses (xylan) |
|---|---|---|---|
| 87 g | 6.95% | 65.2 g | 15.0 g |

Nitren solution

| Solution, total | Nitren, measured | Ni, measured |
|---|---|---|
| 869 g | 2.73% | 6.69 g/L |
| | 23.7 g | 5.8 g |

Total quantity used

| Liquor | Nitren | Ni |
|---|---|---|
| 956 g | 23.7 g | 5.8 g |

Filter cake $C_1$

| Tare | Ni, measured | Ni, total |
|---|---|---|
| 174.4 g | 9.68 g/kg | 1.67 g |
| 18.00% | | 28.80% |

Extract E1

| Tare | Loss | Ni, measured | Ni, total |
|---|---|---|---|
| 761 g | 22.6 g | 4.95 g/L | 3.88 g |
| 79.60% | 2.40% | | 66.90% |

Difference = −0.25 g Ni = −0.43% of the total amount of Ni used $1^{st}$ washing ($H_2O$)

Total amount used corresponds to 96.9% of the expressed fibrous material from extract = 1.62 g Ni (sample taking = 0.05 g Ni loss)

| Liquor | Filter cake $C_1$ | Water |
|---|---|---|
| 1000.1 g | 167.1 g | 833 g |

Filter cake $C_2$

| Tare | Ni, measured | Ni, total |
|---|---|---|
| 155.2 g | 4.34 g/kg | 0.67 g |
| (15.5%) | | 11.60% |

Filtrated material $W_1$

| Tare | Loss | Ni, measured | Ni, total |
|---|---|---|---|
| 837.6 g | 7.3 g | 0.51 g/L | 0.43 g |
| (83.7%) | (0.7%) | | 7.40% |

Difference = −0.52 g Ni = −8.6% of the total amount of Ni used $2^{nd}$ washing ($H_2O$)

Total amount used corresponds to 96.4% of the expressed fibrous material from the $1^{st}$ wash (sample taking = 0025 g Ni loss (93.4% of pulp $C_0$)

| Weight of sample | Filter cake $C_2$ | Water |
|---|---|---|
| 894.5 g | 149.5 g | 745 g |

Filter cake $C_2$

| Tare | Ni, measured | Ni, total |
|---|---|---|
| 147.9 g | 2.49 g | 0.37 g |
| (16.6%) | | 6.40% |

Filtrated material $W_2$

| Tare | Loss | Ni, measured | Ni, total |
|---|---|---|---|
| 741.9 g | 4.7 g | 0.32 g/L | 0.24 g |
| (82.9%) | (0.5%) | | 4.15% |

-continued

3rd washing (0.5% acetic acid)

Total amount used corresponds to 95.8% of the expressed fibrous material from the 2nd wash = 0.35 g Ni (sample taking = 0.02 g Ni loss) (89.5% of pulp $C_0$)

| Weight of sample | Filter cake $C_3$ | 0.5% acetic acid |
|---|---|---|
| 847.7 g | 141.7 g | 706 g |

Filter cake $C_4$

| Tare | Ni, measured | Ni, total |
|---|---|---|
| 137.4 g (16.2%) | 0.37 g/kg | 51 mg 0.80% |

Filtrated material $W_3$

| Tare | Loss | Ni, measured | Ni, total |
|---|---|---|---|
| 704.8 g (83.1%) | 5.5 g (0.7%) | 0.48 g/L | 0.34 g 5.90% |

Difference = +0.04 g Ni = +0.6% of the mass of Ni used
The total loss of nickel is 2.2%.

The invention claimed is:

1. A method to separate hemicelluloses from a hemicellulose-containing biomass, comprising the steps of:
   a) extracting the hemicelluloses from the hemicellulose-containing biomass by treating the hemicelluloses with a complex compound in aqueous solution and thereby forming a soluble complex of the hemicelluloses, and using as the complex compound a coordination compound from a transition metal and at least one polydentate ligand selected from the group consisting of at least one of tris(2-aminoethyl)amine, ethylene diamine and diethylene triamine, and
   b) separating the complexed hemicelluloses of step a) from the biomass.

2. A method according to claim 1, wherein raw pulp is used as the hemicellulose-containing biomass.

3. A method according to claim 2, wherein the raw pulp used is obtained by delignification of a lignocellulose-containing biomass.

4. A method according to claim 1, further comprising the step of providing the biomass in a comminuted form.

5. A method according to claim 1 wherein said transition metal is selected from the group consisting of at least one of nickel, copper, cadmium, cobalt, palladium and zinc.

6. A method according to claim 1 wherein the complex compound comprises [Ni(tris(2-aminoethyl)amine)(OH)$_2$].

7. A method according to claim 1 wherein the complex compound comprises an aqueous solution in a concentration of from about 0.1 to about 10% by weight.

8. A method according to claim 7 wherein the concentration of the complex compound in the aqueous solution is a concentration of about 1 to 3% by weight.

9. A method according to claim 1 wherein the extracting step is carried out at a temperature of from about 0° C. to about 90° C.

10. A method according to claim 9 wherein the extracting step is carried out at a temperature of from about 10° C. to about 80° C.

11. A method according to claim 10 wherein the extracting step is carried out at a temperature of from about 20° C. to about 40° C.

12. A method according to claim 11 wherein the extracting step is carried out at a pH value of from about 10 to about 14.

13. A method according to claim 12 wherein the extracting step is carried out at a pH value of from about 13 to about 14.

14. A method according to claim 11, wherein the extracting step is carried out for about from 5 mm to about 16 hours.

15. A method according to claim 14 wherein during the extracting step a liquor ratio in the range of from about 1:3 to about 1:30, is selected.

16. A method according to claim 15 wherein the extracting step is carried out at a pH value of from about 10 to about 14.

17. A method according to claim 1, wherein the extracting step is carried out for about from 5 mm to about 16 hours.

18. A method according to claim 17 wherein the extracting step is carried out for about from 15 minutes to about 2 hours.

19. A method according to claim 1 wherein during the extracting step a liquor ratio in the range of from about 1:3 to about 1:30, is selected.

20. A method according to claim 19 wherein during the extracting step, a liquor ratio of from about 1:5 to about 1:20 is selected.

21. A method according to claim 1 wherein the separating step further comprises separating the complexed hemicelluloses from the remaining biomass by filter presses.

22. A method according to claim 1 further comprising the step of subjecting the biomass, modified by the method to at least one washing stage.

23. A method according to claim 22 wherein the transition metal is nickel and further comprising the step of subjecting the biomass, modified by the method to washing with water, for reducing the nickel contents and subsequently with at least one of diluted acid or a complex former for the transition metal.

24. A method according to claim 1, further comprising the step of treating the complexed hemicelluloses after separation from the biomass to precipitate the hemicelluloses from the solution.

25. A method according to claim 24 wherein the precipitation of the hemicelluloses is carried out by lowering the pH value to below 10.

26. A method according to claim 25, further comprising the step of isolating the hemicelluloses after the precipitation.

27. A method according to claim 25 wherein the precipitation of the hemicellulose is carried out by lowering the pH value to be in the range of between from about 3 to about 5.

28. A method according to claim 1 wherein the transition metal is nickel and further comprising the step of washing the separated hemicelluloses with an aqueous solution of at least one of ethanol amine, NaOH, ammonia and tris(2-aminoethyl)amine to reduce the nickel content.

* * * * *